(12) United States Patent  
Inoue et al.

(10) Patent No.: US 6,217,218 B1  
(45) Date of Patent: Apr. 17, 2001

(54) HYDRODYNAMIC BEARING SPINDLE MOTOR

(75) Inventors: Hiroshi Inoue, Osaka; Masashi Omura, Hyogo; Hiromichi Inomata; Kaoru Matsuoka, both of Osaka; Shigeo Obata, Hyogo, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/418,005

(22) Filed: Oct. 14, 1999

(30) Foreign Application Priority Data

Oct. 16, 1998 (JP) ................................. 10-294935

(51) Int. Cl.$^7$ ..................................... F16C 33/72
(52) U.S. Cl. ...................... 384/119; 384/100; 384/144
(58) Field of Search .................... 384/100, 107, 384/114, 119, 130, 144; 360/99.08

(56) References Cited

U.S. PATENT DOCUMENTS

| | | | |
|---|---|---|---|
| 5,112,141 | * | 5/1992 | Asada et al. ........................... 384/100 |
| 5,647,672 | * | 7/1997 | Fukutani ................................ 384/100 |
| 5,708,539 | * | 1/1998 | Schuh .................................. 360/99.08 |
| 5,789,836 | * | 8/1998 | Hayakawa ......................... 384/107 X |
| 5,810,480 | * | 9/1998 | Asada et al. ........................... 384/107 |
| 5,859,745 | * | 1/1999 | Elsing et al. ........................ 360/99.08 |

* cited by examiner

Primary Examiner—Thomas R. Hannon  
(74) Attorney, Agent, or Firm—Wenderoth, Lind & Ponack, L.L.P.

(57) ABSTRACT

A hydrodynamic bearing spindle motor comprising: a fixed member which has a radial bearing portion; a rotational member; a rotary shaft which is rotatably supported by the radial bearing portion of the fixed member and is secured to a substantially central location of the rotational member so as to extend in a vertical direction of the hydrodynamic bearing spindle motor such that the rotational member is disposed above the fixed member; lubricant which is provided between the radial bearing portion of the fixed member and the rotary shaft; a projection which is provided on a lower face of the rotational member so as to be disposed radially outwardly of the rotary shaft and has an oblique inner periphery expanding gradually radially outwardly towards a distal end of the projection; a lubricant receiving member which is secured to an upper face of the fixed member so as to be disposed radially outwardly of the projection; and oil repellent for repelling the lubricant, which is applied to the projection and its vicinity; wherein the lubricant receiving member is provided at a location to which the lubricant repelled by the oil repellent and scattered from the projection through rotation of the rotational member adheres.

6 Claims, 1 Drawing Sheet

HYDRODYNAMIC BEARING SPINDLE MOTOR

BACKGROUND OF THE INVENTION

1. Field of the Invention

The present invention relates to a hydrodynamic bearing spindle motor suitable for use in a hard disk or the like used for a personal computer and various audio-visual appliances.

2. Description of the Prior Art

FIG. 2 shows a hydrodynamic bearing spindle motor for use in a known hard disk. In the known hydrodynamic bearing spindle motor of FIG. 2, a base 1 has radial bearing portions 1a and acts as a fixed member. A rotary shaft 2 is secured to a flange 4 so as to be rotated together with the flange 4 and is rotatably supported by the radial bearing portions 1a of the base 1 and a thrust bearing 9 so as to be smoothly rotated at high speed. Lubricant 3 is provided in a clearance between the radial bearing portions 1a and the rotary shaft 2 and oil having a predetermined viscosity is usually employed as the lubricant 3. A plurality of, for example, four disks 5 are mounted on an outer periphery of the flange 4 in parallel with each other and the flange 4 is coaxially fixed to the rotary shaft 2 so as to act as a rotational member. Each of the disks 5 is constituted by a magnetic disk used generally for a hard disk of a personal computer. A coil 6 is fixed to the base 1, while a magnet 7 is attached to the flange 4 so as to confront the coil 6. By effecting flow of electric current through the coil 6, rotational force is generated between the coil 6 and the magnet 7 and thus, the flange 4 can be rotated at high speed. A clearance 8 is formed between the base 1 and the flange 4. The thrust bearing 9 is secured to the base 1 so as to bear thrust load of the rotary shaft 2.

Operation of the known hydrodynamic bearing spindle motor of the above described arrangement is described below. By effecting flow of electric current through the coil 6, rotational force is generated between the coil 6 and the magnet 7 and thus, the flange 4 having the disks 5 mounted thereon is rotated together with the magnet 7 at high speed. Therefore, information signals such as image and sound signals and text data are recorded on the disks 5 by a magnetic head (not shown). Meanwhile, if the information signals have been recorded on the disks 5, the information signals can be reproduced on the disks 5 by the magnetic head.

Since the lubricant 3 is provided between the rotary shaft 2 and the radial bearing portions 1a as described above, the flange 4 secured to the rotary shaft 2 can be rotated at high speed smoothly. Meanwhile, lubricant (not shown) is provided also between the rotary shaft 2 and the thrust bearing 9 so as to serve to bear thrust load of the rotary shaft 2 smoothly.

However, in the known hydrodynamic bearing spindle motor, the lubricant 3 provided in the clearance between the radial bearing portions 1a and the rotary shaft 2 leaks out of the radial bearing portions 1a due to impact caused by fall of the known hydrodynamic bearing spindle motor, etc. and is carried through the clearance 8 between the flange 4 and the base 1 by centrifugal force due to high-speed rotation of the flange 4 so as to finally adhere to the disks 5. If the lubricant 3 has adhered to the disks 5 as described above, such an inconvenience is incurred that the recording head cannot properly record and reproduce the image and sound signals, etc. on the disks 5.

SUMMARY OF THE INVENTION

Accordingly, an essential object of the present invention is to provide, with a view to eliminating the above mentioned drawback of prior art hydrodynamic bearing spindle motor, a hydrodynamic bearing spindle motor in which even if lubricant leaks out of a bearing portion due to impact caused by fall of the hydrodynamic bearing spindle motor, etc., the lubricant does not adhere to disks such that recording and reproduction can be performed properly.

In order to accomplish this object of the present invention, a hydrodynamic bearing spindle motor according to the present invention comprises: a fixed member which has a radial bearing portion; a rotational member; a rotary shaft which is rotatably supported by the radial bearing portion of the fixed member and is secured to a substantially central location of the rotational member so as to extend in a vertical direction of the hydrodynamic bearing spindle motor such that the rotational member is disposed above the fixed member; lubricant which is provided between the radial bearing portion of the fixed member and the rotary shaft; a projection which is provided on a lower face of the rotational member so as to be disposed radially outwardly of the rotary shaft and has an oblique inner periphery expanding gradually radially outwardly towards a distal end of the projection; a lubricant receiving means which is secured to an upper face of the fixed member so as to be disposed radially outwardly of the projection; and oil repellent for repelling the lubricant, which is applied to the projection and its vicinity; wherein the lubricant receiving means is provided at a location to which the lubricant repelled by the oil repellent and scattered from the projection through rotation of the rotational member adheres.

In accordance with the present invention, even if the lubricant leaks out of the bearing portion due to impact caused by fall of the hydrodynamic bearing spindle motor, etc., the lubricant does not adhere to the disks and thus, recording and reproduction can be performed properly.

BRIEF DESCRIPTION OF THE DRAWINGS

This object and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
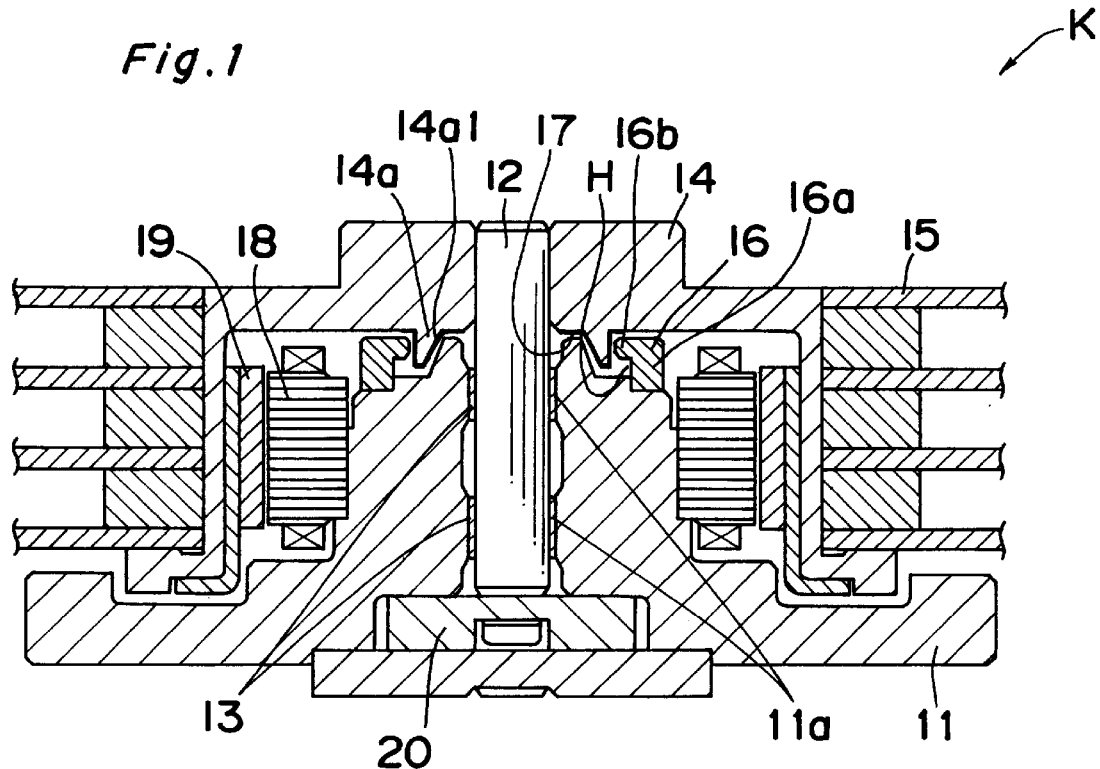
FIG. 1 is a sectional view of a hydrodynamic bearing spindle motor according to one embodiment of the present invention.
Figure 2:
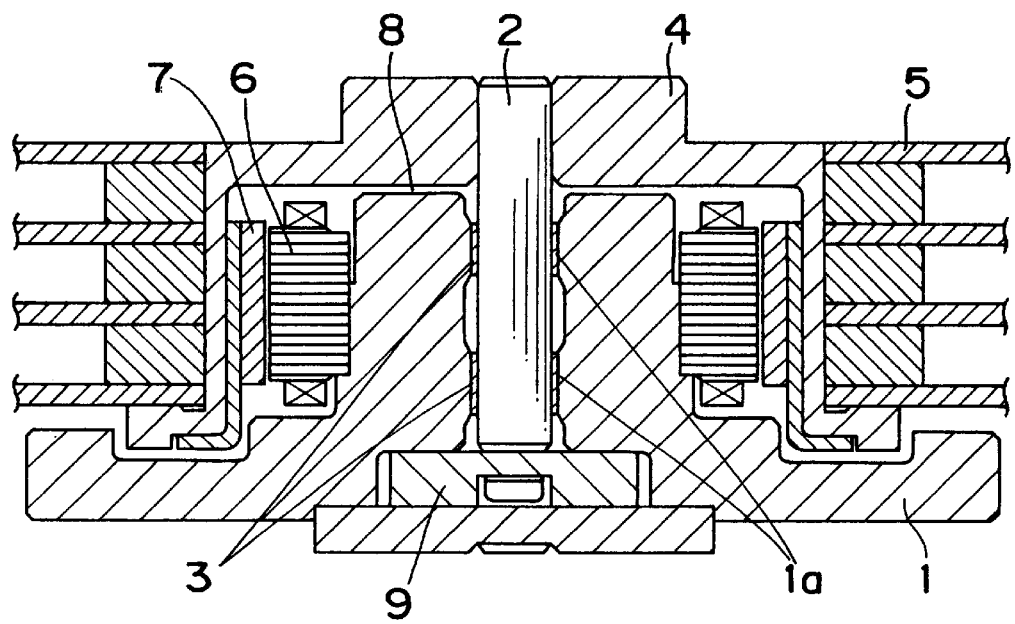
FIG. 2 a sectional view of a prior art hydrodynamic bearing spindle motor (already referred to).

Referring to the drawings, FIG. 1 shows a hydrodynamic bearing spindle motor K according to one embodiment of the present invention. In the hydrodynamic bearing spindle motor K, a base 11 has radial bearing portions 11a confronting a rotary shaft 12 and acts as a fixed member. The rotary shaft 12 is rotatably supported by the radial bearing portions 11a of the base 11 and is secured to a substantially central location of a flange 14 acting as a rotational member so as to be rotated together with the flange 14 and extends through the base 11 and the flange 14 in a vertical direction of the hydrodynamic bearing spindle motor K in FIG. 1 such that the flange 14 is disposed above the base 11. Lubricant 13 is provided in a clearance between the radial bearing portions 11a and the rotary shaft 12 and oil having a predetermined viscosity is usually employed as the lubricant 13. A plurality of disks, for example, four magnetic disks 15 in this embodiment are mounted on an outer periphery of the flange 14 in parallel with each other and the flange 14 is fixed to the rotary shaft 12 so as to be rotated at high speed. A projection 14a is provided at a location on a lower face of the flange 14 in the vicinity of an area where the flange 14 is fixed to the rotary shaft 12. The projection 14a is disposed radially outwardly of the rotary shaft 12 so as to confront the base 11. Furthermore, the projection 14a has an oblique inner periphery 14a1 expanding gradually radially outwardly towards a distal end of the projection 14a so as to be tapered towards the distal end of the projection 14a. Thus, diameter of the inner periphery 14a1 of a distal end portion of the projection 14a is larger than that of the inner periphery 14a1 of a base portion of the projection 14a adjacent to the flange 14.

A cover 16 acting as a lubricant receiving means is attached to an upper face of the base 11 so as to be disposed radially outwardly of the projection 14a and has a substantially L-shaped section formed by a side wall 16a and a protrusion 16b projecting radially inwardly from an upper portion of the side wall 16a towards the projection 14a such that a hollow H is defined by an inner face of the side wall 16a, a lower face of the protrusion 16b and the upper face of the base 11. This cover 16 is provided at such a location that the lubricant 13 repelled by oil repellent 17 referred to below and scattered from the projection 14a through rotation of the flange 14 adheres to the cover 16, more specifically, to the inner face of the side wall 16a of the cover 16 via the hollow H. The protrusion 16b is provided for preventing the lubricant 13 adhering to the inner face of the side wall 16a from adhering to the flange 14 again while proceeding upwardly due to impact caused by fall of the hydrodynamic bearing spindle motor K, etc. If the lubricant 13 adheres to the flange 14 again, such a problem of prior art will arise that the lubricant 13 is carried out of the flange 14 by centrifugal force due to high-speed rotation of the flange 14 and adheres to the magnetic disks 15. However, in the hydrodynamic bearing spindle motor K, the above mentioned problem of prior art is eliminated by the protrusion 16b.

The oil repellent 17 is applied to the projection 14a and its vicinity so as to repel the lubricant 13 which has leaked out of the radial bearing portions 11a. A coil 18 is fixed to the base 11, while a magnet 19 is attached to the flange 14 so as to confront the coil 18. By effecting flow of electric current through the coil 18, rotational force is generated between the coil 18 and the magnet 19 and thus, the flange 14 is rotated together with the magnet 19 at high speed. A thrust bearing 20 for bearing thrust load of the rotary shaft 12 is secured to the base 11.

Hereinafter, operation of the hydrodynamic bearing spindle motor K of the above described arrangement is described. Initially, by effecting flow of electric current through the coil 18, rotational force is generated between the coil 18 and the magnet 19 and thus, the flange 14 having the magnetic disks 15 mounted thereon is rotated together with the magnet 19 at high speed. Therefore, information signals such as image and sound signals and text data are recorded on the magnetic disks 15 by a magnetic head (not shown). Meanwhile, if the information signals have been recorded on the magnetic disks 15, the information signals can be reproduced on the magnetic disks 15 by the magnetic head.

Since the lubricant 13 is provided between the rotary shaft 12 and the radial bearing portions 11a as described above, the flange 14 secured to the rotary shaft 12 can be rotated at high speed smoothly. Meanwhile, lubricant (not shown) is provided also between the rotary shaft 12 and the thrust bearing 20 so as to serve to bear thrust load of the rotary shaft 12 smoothly.

Supposing here that a surplus portion of the lubricant 13 leaks out of the clearance between the radial bearing portions 11a and the rotary shaft 12 due to impact caused by fall of the hydrodynamic bearing spindle motor K, etc. and is carried out of the radial bearing portions 11a by centrifugal force upon high-speed rotation of the flange 14, the lubricant 13 might proceed between the flange 14 and the base 11. However, in the hydrodynamic bearing spindle motor K, this lubricant 13 is repelled by the oil repellent 17 applied to the projection 14a of the flange 14 and is scattered by centrifugal force to the inner face of the side wall 16a of the cover 16 from the distal end portion of the projection 14a having the oil repellent 17 applied thereto. Since the cover 16 having the side wall 16a is attached to the base 11 acting as the fixed member, the lubricant 13 which has adhered to the inner face of the side wall 16a is prevented from proceeding further outwardly, so that such an undesirable phenomenon that the lubricant 13 leaks outwardly so as to adhere to the magnetic disks 15 does not happen in the hydrodynamic bearing spindle motor K.

The projection 14a has the oblique inner periphery 14a1 expanding gradually radially outwardly towards the distal end of the projection 14a as described earlier. Furthermore, the distal end of the projection 14a of the flange 14 is so disposed as to be coincident with or lower than the lower face of the protrusion 16b of the cover 16 in the vertical direction of the hydrodynamic bearing spindle motor K Therefore, by centrifugal force produced by high-speed rotation of the flange 14, the lubricant 13 repelled by the oil repellent 17 after having adhered to the oblique inner periphery 14a1 of the projection 14a is carried downwardly on the oblique inner periphery 14a1 of the projection 14a and is scattered radially outwardly from the distal end of the projection 14a towards the inner face of the side wall 16a of the cover 16 via the hollow H so as to adhere to the inner face of the side wall 16a of the cover 16.

As is clear from the foregoing description of the hydrodynamic bearing spindle motor K of the present invention, the annular projection 14a having the oblique inner periphery 14a1 expanding gradually radially outwardly towards the distal end of the projection 14a is provided on the flange 14 in the vicinity of the area where the flange 14 is fixed to the rotary shaft 12, while the cover 16 is attached to the base 11 so as to be disposed radially outwardly of the projection 14a and the oil repellent 17 is applied to the projection 14a and its vicinity.

Accordingly, the present invention achieves such a marked effect that even if the lubricant leaks out of the radial bearing portions due to impact caused by fall of the hydrodynamic bearing spindle motor, etc., the lubricant which has leaked out of the radial bearing portions does not adhere to the magnetic disks and thus, recording and reproduction can be performed properly.

What is claimed is:

1. A hydrodynamic bearing spindle motor comprising:
   a fixed member which has a radial bearing portion;
   a rotational member;
   a rotary shaft which is rotatably supported by the radial bearing portion of the fixed member and is secured to a substantially central location of the rotational member so as to extend in a vertical direction of the hydrodynamic bearing spindle motor such that the rotational member is disposed above the fixed member;

lubricant which is provided between the radial bearing portion of the fixed member and the rotary shaft;

a projection which is provided on a lower face of the rotational member so as to be disposed radially outwardly of the rotary shaft and has an oblique inner periphery expanding gradually radially outwardly towards a distal end of the projection;

a lubricant receiving means which is secured to an upper face of the fixed member so as to be disposed radially outwardly of the projection; and oil repellent for repelling the lubricant, which is applied to the projection and its vicinity;

wherein the lubricant receiving means is provided at a location to which the lubricant repelled by the oil repellent and scattered from the projection through rotation of the rotational member adheres.

2. A hydrodynamic bearing spindle motor as claimed in claim 1, further comprising:

a thrust bearing for bearing a thrust load of the rotary shaft, which is secured to the fixed member.

3. A hydrodynamic bearing spindle motor as claimed in claim 1, wherein the lubricant receiving means is constituted by a cover having a substantially L-shaped section formed by a side wall and a protrusion projecting radially inwardly from an upper portion of the side wall towards the projection such that a hollow is defined by an inner face of the side wall, a lower face of the protrusion and the upper face of the fixed member.

4. A hydrodynamic bearing spindle motor as claimed in claim 3, further comprising:

a thrust bearing for bearing a thrust load of the rotary shaft, which is secured to the fixed member.

5. A hydrodynamic bearing spindle motor as claimed in claim 3, wherein the distal end of the projection is so disposed as to be coincident with or lower than the lower face of the protrusion of the cover in the vertical direction of the hydrodynamic bearing spindle motor such that the lubricant is scattered from the distal end of the projection to the inner face of the side wall of the cover via the hollow.

6. A hydrodynamic bearing spindle motor as claimed in claim 5, further comprising:

a thrust bearing for bearing a thrust load of the rotary shaft, which is secured to the fixed member.

\* \* \* \* \*